(12) United States Patent
Olsson

(10) Patent No.: US 6,871,524 B2
(45) Date of Patent: Mar. 29, 2005

(54) METHOD, IMPACT MACHINE, AND EQUIPMENT INCLUDED IN AN IMPACT MACHINE

(75) Inventor: Håkan Olsson, Karlskoga (SE)

(73) Assignee: Morphic Technologies Aktiebolag (publ), Karlskoga (SE)

( * ) Notice: Subject to any disclaimer, the term of this patent is extended or adjusted under 35 U.S.C. 154(b) by 14 days.

(21) Appl. No.: 10/296,330

(22) PCT Filed: Apr. 26, 2001

(86) PCT No.: PCT/SE01/00893
§ 371 (c)(1),
(2), (4) Date: May 6, 2003

(87) PCT Pub. No.: WO01/96044
PCT Pub. Date: Dec. 20, 2001

(65) Prior Publication Data
US 2003/0167819 A1 Sep. 11, 2003

(30) Foreign Application Priority Data

| May 31, 2000 | (SE) | ............................................. 0002030 |
| Sep. 15, 2000 | (SE) | ............................................. 0003279 |
| Dec. 11, 2000 | (SE) | ............................................. 0004552 |

(51) Int. Cl.⁷ .................................................. B21J 7/06
(52) U.S. Cl. ...................................... 72/355.6; 72/407
(58) Field of Search .............................. 72/407, 355.6, 72/360, 334, 335; 425/352, 356; 470/162

(56) References Cited
U.S. PATENT DOCUMENTS

| 3,347,080 | A | * | 10/1967 | Bailey et al. .................. 72/334 |
| 3,805,581 | A | * | 4/1974 | Thibodeau .................... 72/407 |
| 3,857,272 | A | | 12/1974 | Voitsekhovsky et al. ....... 72/407 |
| 4,378,688 | A | | 4/1983 | Spanke et al. ................. 72/420 |
| 4,590,780 | A | * | 5/1986 | Bachmann .................... 72/328 |
| 4,918,970 | A | * | 4/1990 | Ishinaga .................... 72/355.6 |
| 5,095,731 | A | | 3/1992 | Greslin ........................ 72/361 |
| 5,326,242 | A | | 7/1994 | Katagiri et al. ............... 425/78 |
| 5,366,363 | A | | 11/1994 | Good et al. ................... 425/78 |
| 5,551,856 | A | | 9/1996 | Katagiri ....................... 425/78 |
| 5,746,085 | A | * | 5/1998 | Harada et al. ............. 72/355.6 |
| 6,250,128 | B1 | * | 6/2001 | Ando et al. ................ 72/355.6 |
| 6,698,267 | B1 | * | 3/2004 | Olsson ....................... 72/355.6 |

* cited by examiner

Primary Examiner—Daniel C. Crane
(74) Attorney, Agent, or Firm—Michael Bednarek; Shaw Pittman LLP

(57) ABSTRACT

The invention relates to a method for the manufacture of an annular article, which substantially consists of metal, ceramic material, and/or polymer. A cavity in a die is filled with a formable working material, which shall form said article. A tubular, upper punch (17) is introduced into the upper mouth of a hole in a die (34), so that a closed mould cavity is formed. The upper punch and a lower punch (27) are simultaneously struck towards one another at such a high velocity that the working material is plasticized and flows out and fills the mould cavity, and thereafter the upper punch is removed. Then, a mandrel (35) in the lower punch is driven out of the annular body by means of a mandrel expulsor (170), which is pressed against the mandrel from above, and thereafter the annular body is from below pushed out of the die by mean of the lower punch. The invention also relates to an equipment for the carrying out of the method.

15 Claims, 14 Drawing Sheets

METHOD, IMPACT MACHINE, AND EQUIPMENT INCLUDED IN AN IMPACT MACHINE

This application is a 371 of PCT/SE01/00893, filed Apr. 26, 2001.

TECHNICAL FIELD

The invention relates to a method for the manufacture of an annular article, which substantially consists of metal, ceramic material, and/or polymer. The invention also relates to an equipment included in an impact machine for the manufacture of an annular article, which substantially consists of metal, ceramic material, and/or polymer, and to the impact machine in which the equipment is included.

BACKGROUND OF THE INVENTION

Impact machines for working by the employment of high kinetic energy are machines for working in the first place metal, such as cutting, punching, and plastic forming of powder components, powder compaction, and similar operations, in which the velocity of a ram, which may consist of a hydraulic piston, may be essentially higher than in conventional presses. Also polymeric and ceramic working materials can be conceived, as well as various composites of metals, polymers and ceramic materials. The working principle is based on the development of a very high kinetic energy of short duration instead of a high static press force of long duration.

Impact machines are well suited for the manufacture of annular articles, such as gears, bushings, and the like, in a closed mould cavity. However, it is a problem to get the formed body out of the mould cavity without damaging it. This particularly is true for articles which are formed of metal powder and which have not been consolidated through coalescence of the powder, i.e. welding of the powder grains, to form a well united, strong body. Therefore, it is a particularly great risk for damages when articles are manufactured, which are formed of powder, but also articles which are formed of a solid blank can crack or form layers, when they are pushed out of the mould cavity. Besides, it has not been possible to perform the manufacture in a rational mode according to prior art, i.e. in a mode which provides the high production capacity which is required in the first place for the manufacture of mass products, such as gears, bushings, and the like. For example it is a problem to remove the mandrel out of the formed article by known technique.

DISCLOSURE OF THE INVENTION

It is the purpose of the invention to address the above complex of problems, wherein it is a first object of the invention to provide a method and an equipment included in an impact machine, which allows a rational manufacture of annular articles of a formable working material. It is also an object to provide a technique which makes it possible to push out the formed product from its mould cavity without damaging the product. The invention particularly aims at making it possible to manufacture annular articles which are essentially void of communicating pores and which have so high strength that they can be pushed out of their mould cavities without being damaged and be transported to a furnace in order to be heated to a sintering temperature in a subsequent treatment, so that the powder grains which have been softened and deformed in the machine are welded together (sinter, coalesce) to form a very dense body with high strength.

Further objectives, characteristic features and aspects of the invention will be apparent from the appending patent claims and from detailed descriptions of some embodiments.

BRIEF DESCRIPTION OF DRAWINGS

In the following description of the invention, some preferred embodiments will be described with reference to the accompanying drawings, in which.

DETAILED DESCRIPTION OF THE INVENTION

Embodiment According to FIGS. 1–9

Figure 1:
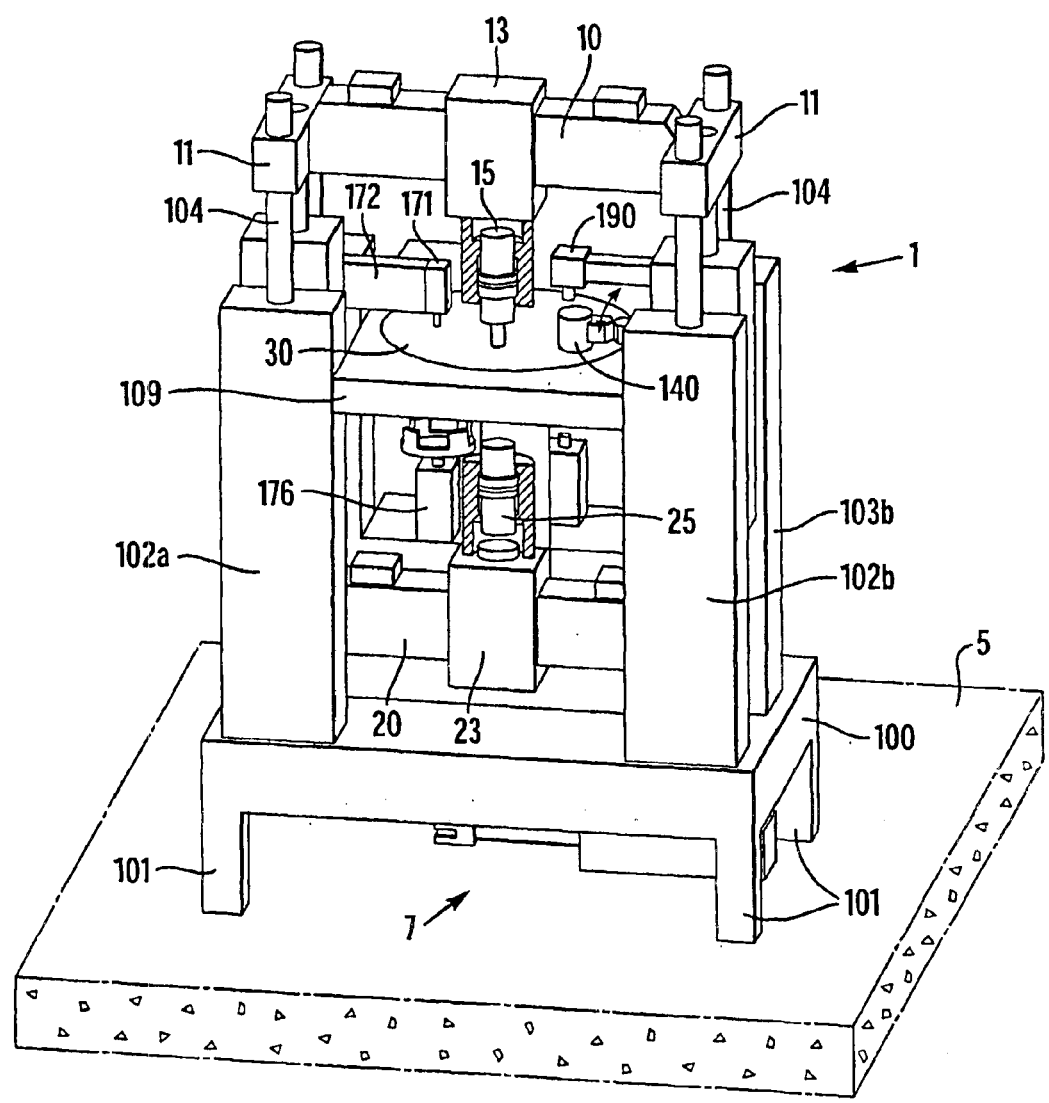
FIG. 1 is a perspective view of an impact machine for the employment of the invention, which machine includes the equipment of the invention according to a first embodiment, a forming station facing the viewer.
Figure 2:
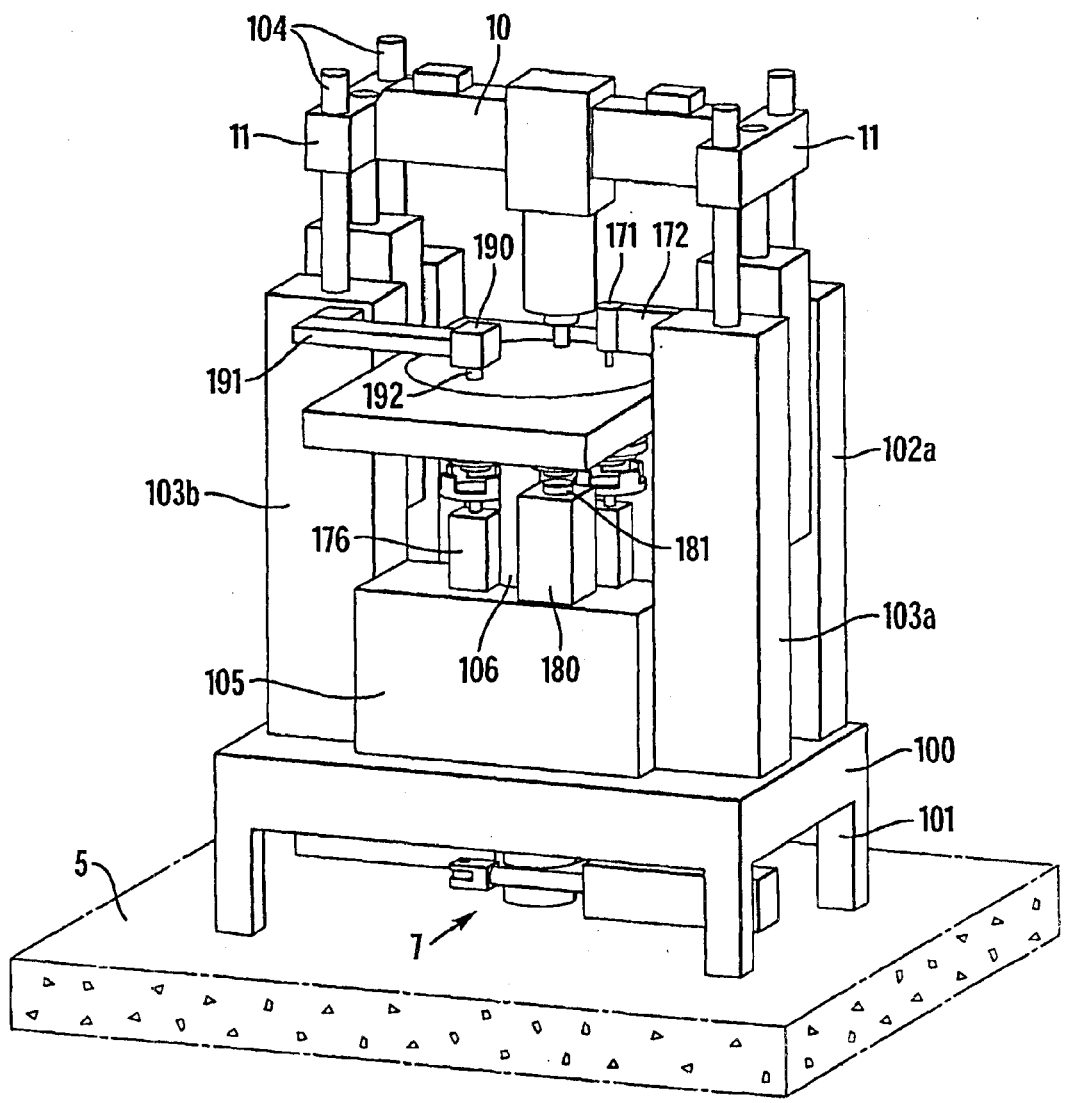
FIG. 2 shows the same impact machine in a perspective view from the opposite direction.

With reference first to FIGS. 1 and 2, an impact machine is generally designated 1. Its main parts, FIGS. 3 and 4, consist of an upper impact unit 2, a lower impact unit 3, a central unit 4, comprising a turntable 30 which can be rotated in a horizontal plane, motion members 7 for the turntable 30, and a stand.

The stand consists of a strong steel plate 100 having four legs 101, which are anchored on a foundation 5, two pairs of columns 102a, 102b; and 103a, 103b, which extend upwards from the plate 100, four vertical rods—guides—which proceed vertically upwards from the columns 102, 103, a block 105 on the plate 100, and a tubular column 106 on the block 105.

The turntable 30, which is concentric with the column 106, rests on the column 106 via not shown thrust bearings and can be rotated via a rotational shaft about a vertical centre of rotation by means of said motion members 7 under the plate 100, which shaft rotatably extends through the plate 100, the block 105, and the tubular column 106. The turntable 30 is also supported laterally by a rectangular, horizontal plate 109, which is stationary mounted between the columns 102a and 103a, on one side, and between the columns 102b and 103b, on the other side. The turntable 30 thus can be said to be radially journalled in the plate 109. A suitable material for the turntable 30 is aluminium or any other light metal or light metal alloy, or any other light material, e.g. a polymer, or a composite material which makes the table construction light.

The turntable 30 contains and carries a number of identical tool units 32, which are evenly distributed at equal distance from the centre of rotation 107 of the table, i.e. with an indexing of 72°. The tool units 32 can, by stepwise turning—indexing—of the turntable 30 clockwise with reference to FIG. 1, adopt desired, indexed positions in five function stations, which according to a preferred embodiment consist of the following stations:

I a filling station
II a forming station
III a mandrel driving down station
IV an ejection station, and
V a re-setting station.

Hydraulic devices in the different units of the impact machine 1, including hydraulic devices in the five function stations, are supplied with pressure fluid from the block 105.

The motion members 7 for the rotation of turntable 30 are provided under the plate 100. The motion members 7 according to the embodiment are of a kind which is known per se and comprise a pair of hydraulic cylinders 130 attached to the bottom side of the plate 100, said hydraulic cylinders having piston rods 131, which are provided to be able to rotate an outer sleeve 133 about 72° about the centre of rotation 107 of the turntable via pivoted links 132 at each stroke which the piston rods 131 perform by means of the hydraulic cylinders 130. The outer sleeve 133 in a known manner is provided with splines with a gap between the splines. An intermediate sleeve, which is not shown, can be manouevered vertically in order to bring the splined outer sleeve into and out of engagement with splines of the rotational shaft 108 in the lower end thereof in the region of said motion members 7. By means of motion members 7 of this kind, large turning forces can be generated, which are required for the indexing of the turntable 30.

Figure 3:
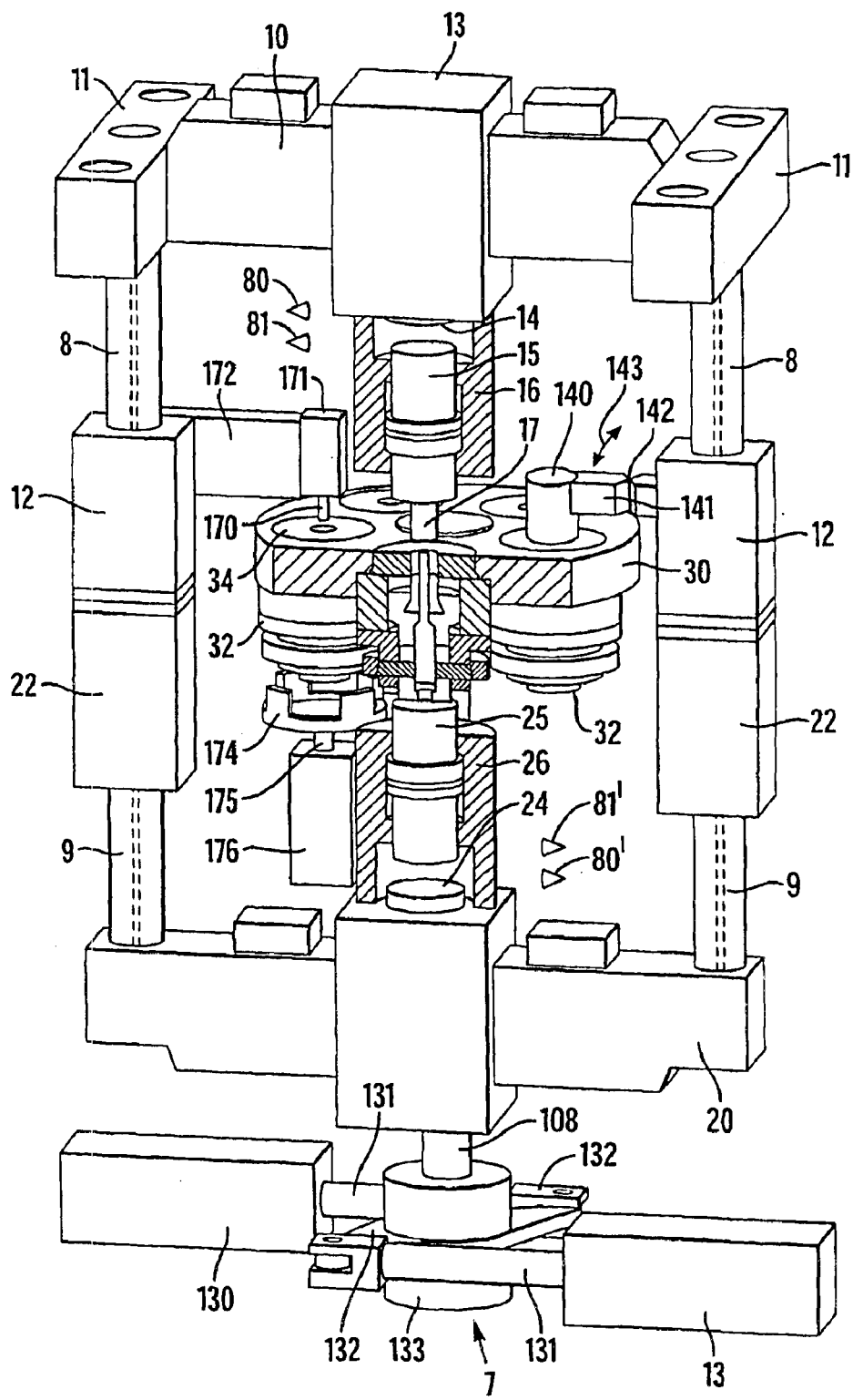
FIG. 3 is a perspective view in the same direction as FIG. 1, illustrating the impact units of the impact machine and a tool-carrying turntable with its function stations with equipments belonging to them.
Figure 4:
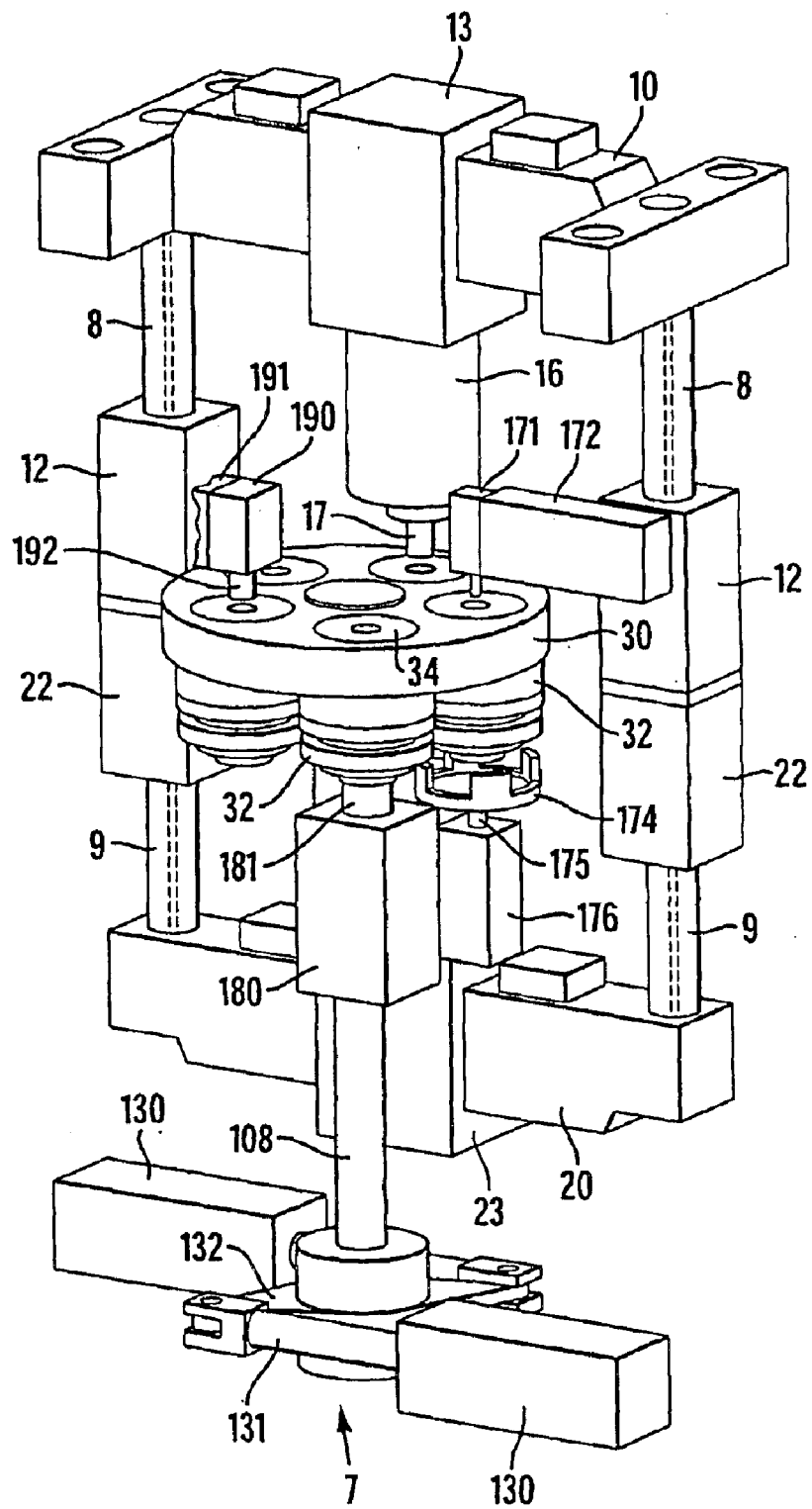
FIG. 4 shows said units, equipment components, and motion members according to FIG. 3 in a perspective view in the opposite direction.

The upper impact unit 2, FIGS. 3 and 4, comprises a yoke 10, which via a pair of piston rods 8 can be raised and lowered by means of a pair of upper, hydraulic lifting cylinders 12, which are provided between and reliably attached to the columns 102a and 103a; and 102b and 103b, respectively. The yoke 10, in the ends thereof, has a pair of side arms 11, which are angled in two opposite directions and have through, vertical borings, which match the guides 104 which extend upwards from the four columns 102a–103b. The guides 104 guide the yoke 10 and thus the entire upper impact unit 2. For the achievement of a good lateral stability of the impact unit, however, also the columns 102a–103b, which secure the upper hydraulic cylinders 12, have great importance.

The yoke 10 carries an upper, hydraulic impact cylinder 13, which is united with the yoke, said impact cylinder containing an upper ram in the form of an impact piston 14. An upper impact body designated 15 is movable in an upper impact body cylinder 16. An upper punch 17 is replacably united with the impact body 15. The upper impact body cylinder 16 is secured to the upper impact cylinder 13.

The lower impact unit 3 comprises a lower yoke 20, which is suspended in a pair of piston rods 9, which can be raised and lowered by means of a pair of lower, hydraulic lifting cylinders 22, which in the same way as the upper lifting cylinders 12 are provided between the stand columns 102a and 103a; and between the columns 102b and 103b, respectively, and reliably united with said columns. The yoke 20 contacts the inner sides of the columns 102a and 103a; and the columns 102b and 103b, respectively, and can slide against said sides, which contributes to a desired lateral stability of also the lower impact unit 3. The yoke 20 carries a lower, hydraulic impact cylinder 23, which is united with the yoke, said impact cylinder 23 contaiing a lower ram in the form of an impact piston 24. A lower impact body designated 25 is movable in a lower impact body cylinder 26 which is secured to the impact cylinder 23.

Figure 5:
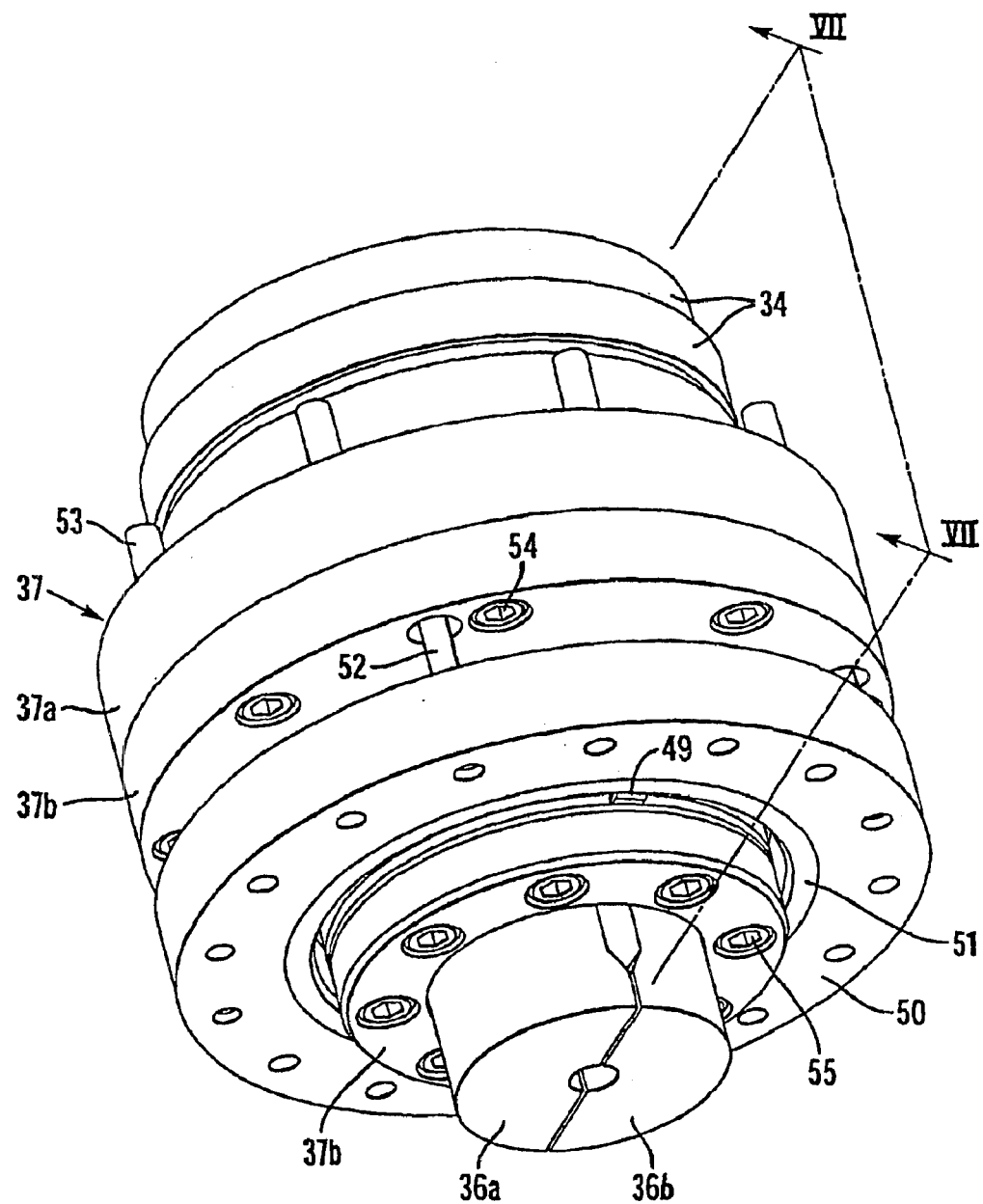
FIG. 5 is a perspective view showing five tool units, which are carried by a turntable in the machine.
Figure 8:
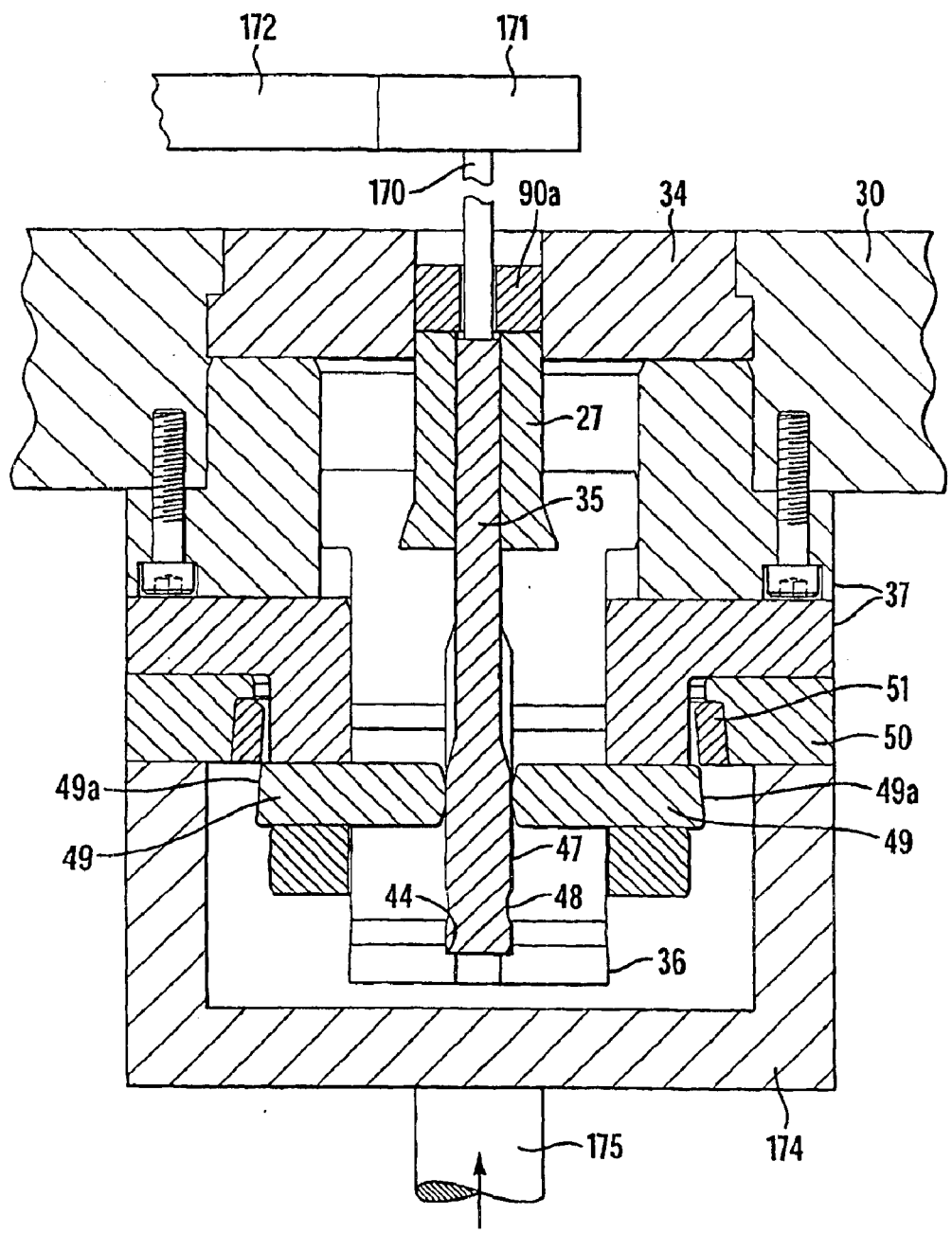
FIG. 8 shows a tool unit in a cross-section in another function station.

As has already been mentioned the turntable 30 contains and carries five identical tool units 32. One such unit according to a first preferred embodiment is shown in detail in FIGS. 5, 6, 8, and 9. FIG. 5 shows the tool unit as appearing in the re-setting station V after re-setting and in the station I prior to supplying the working material according to a mode of operating the machine 1. In FIG. 8 the tool unit is shown in the mandrel driving down station III, and FIG. 10 shows the tool unit in the ejection station IV after ejection of a formed body.

The main parts of the tool units 32 comprise a lower, tubular punch 27, a die 34, a lower punch holder 36, which is slidably movable in a punch holder guide 37, and a mandrel 35. Due to the fact that the lower punch 27 is tubular, like the upper punch 17, and due to the fact that tool unit comprises a mandrel 35, it is possible to manufacture products having a through hole, such as gears, in the impact machine 1.

Figure 6:
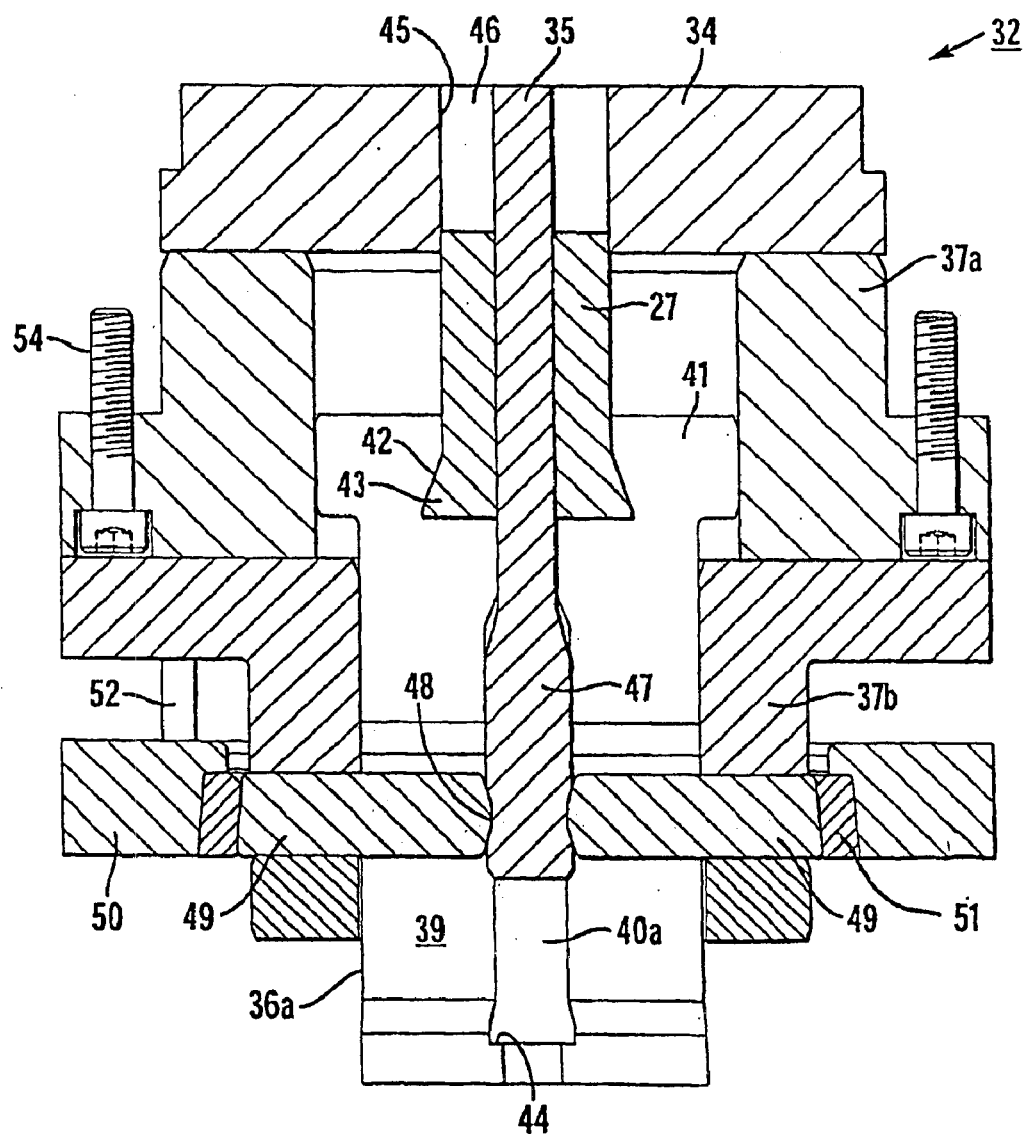
FIG. 6 shows a tool unit in a cross-section in a view along the line VI—VI in FIG. 5.

The lower punch holder 36, FIG. 5 and FIG. 6, consists of two identical halves 36a and 36b, which are pressed to nearly abut one another along a vertical parting plane, in the region of the upper part of the punch holder extending almost half the length of the punch holder, and in a lower part having a short vertical extension. Between these upper and lower parts, the two halves of the punch holder are milled to form a vertical, through groove 39 having a substantial extension in the vertical direction. There is also a vertical, central groove in each punch holder half 36a and 36b, such as the groove 40a in the punch holder half 36a. The opposite groove 40b in the punch holder half 36b is not shown in any drawing. In the bottom of the grooves 40a/40b there is an abutment surface 44, which has the shape of a shelf. In combination, the grooves 39 and 40a/40b allow the punch holder 36 to move in a vertical direction relative to the mandrel 35. In its upper part, each punch holder half 36a and 36b has an outwardly directed flange 41 and a central recess 42, which widens in its bottom part in order to accommodate a head 43 in the lower end of the lower punch 27, which head is correspondingly shaped. Together, the two punch holder halves 36a and 36b retain the lower punch 27.

The illustrated example concerns, as mentioned, the manufacture of products having a through hole, such as gears. Therefore, the lower punch 27 is tubular, and the mandrel 35 extends through the lower punch. In the die 34 there is a through, cylindrical hole 45, the walls of which correspond to the outer shape of the desired product, e.g. a gear. The shape of the hole 45 also corresponds to the outer shape of the lower punch 27 above the head 43 and of the upper punch 17, which like the lower punch 27 has the shape of a tubular sleeve.

The mandrel 35 has an elongated, cylindrical upper part, which extends through the lower punch and up into the mould cavity 46, which is defined by the hole 45 in the die 34 between the two punches 17 and 27. In its lower part, the mandrel has a thicker portion, here denominated grip portion 47, which has a circumferential concavity 48.

The punch holder guide 37 consists of an upper part 37*a* and a lower part 37*b*. The two parts 37*a* and 37*b* have inner surfaces which are cylindrical. The upper part 37*a* has a larger diameter than the lower part 37*b*. The parts 37*a* and 37*b* function as guides for the flange portion 41 and for the main portion, respectively, of the lower punch holder 36, said portions having a correspondingly cylindrical outer shape. The lower part 37*b* in combination with the flange portion 41 of the lower punch holder also function as a retainer of the lower punch holder. The two parts 37*a* and 37*b* are connected to one-another by boltings 55.

In the lower portion of the lower part 37*b* of the punch holder guide there are two opposite recesses for a pair of opposite wedges 49, which are pressed into the concavity 48 of the grip portion 47 of the mandrel 35. The press force is obtained by means of a locking ring 50 and a bushing ring 51 of polyurethane or any other material having a certain flexibility. The wedges 49 allow some resilience because of friction forces which can be exerted upon the mandrel 35 during the working strokes of the machine in the forming station II.

The main parts of the impact units 2 and 3 have already been described above. Further details of these impact units, which in the forming station II are provided at the side of the rotational shaft 108 of the turntable 30, under and over the turntable 30, and which units and details are included in the other functions stations will now be explained. At the same time it will also be explained which functions that are performed in the various stations and how these functions can be carried out. Alternative and/or modified modes of performing the various functions, as well as conceivable modifications of the function station as such, will be explained at the end of the description of how the impact machine 1 is equipped and how it can operate.

I—The Filling Station

It is in the illustrated example supposed that the working material consists of metal powder or other powder material; see the preamble of the description. In its simplest embodiment, the filling device can consist of a filling bucket 140 having the shape of a tube, which can be vertical and be open in its two ends. The lower edge of the filling bucket rests against the die 34 in the tool unit 32 in the filling station I and slides against the upper surface of the turntable 30 during the indexing movements. The filling bucket 140 is mounted on an arm, which extends out from the column 102*b*, FIG. 1 and FIG. 2. The filling bucket 140 contains a sufficient amount of powder for a major number of forming operations and can be re-filled as times goes, either batch-wise or continuously by means of not shown re-filling members. The arm with the filling bucket 140 can be turned aside to and from the tool unit through turning in a hinge by means of motion devices represented by an arrow. The lower punch 27 is in its lower position and the mandrel 35 is in its upper postion, FIG. 6, on a level with the flat upper surfaces of the die 34 and of the turntable 30, which makes it possible for the filing bucket 140 to function in the intended way. The space 46 in the die hole 45 is filled with powder around the mandrel 35. The filling bucket 140 is turned away by means of said motion devices, and thereafter a not shown lid is placed over the die covering the powder in the space 46, e.g. by means of a not shown robot, in order that no powder shall splash out of the die during the transportation of the filled die to the forming station II.

II—The Forming Station

In the forming station the powder which in station I has been filled into the forming cavity is formed to a consolidated, i.e. united body, having a high density in a single, counter-directed stroke of the two impact units 2 and 3, the parts of which have been described above, and which are provided at the side of the centre of rotation of the turntable 30.

The impact units 2 and 3 will now be described more in detail and also how they work in cooperation with the tool unit 32.

Figure 7A:
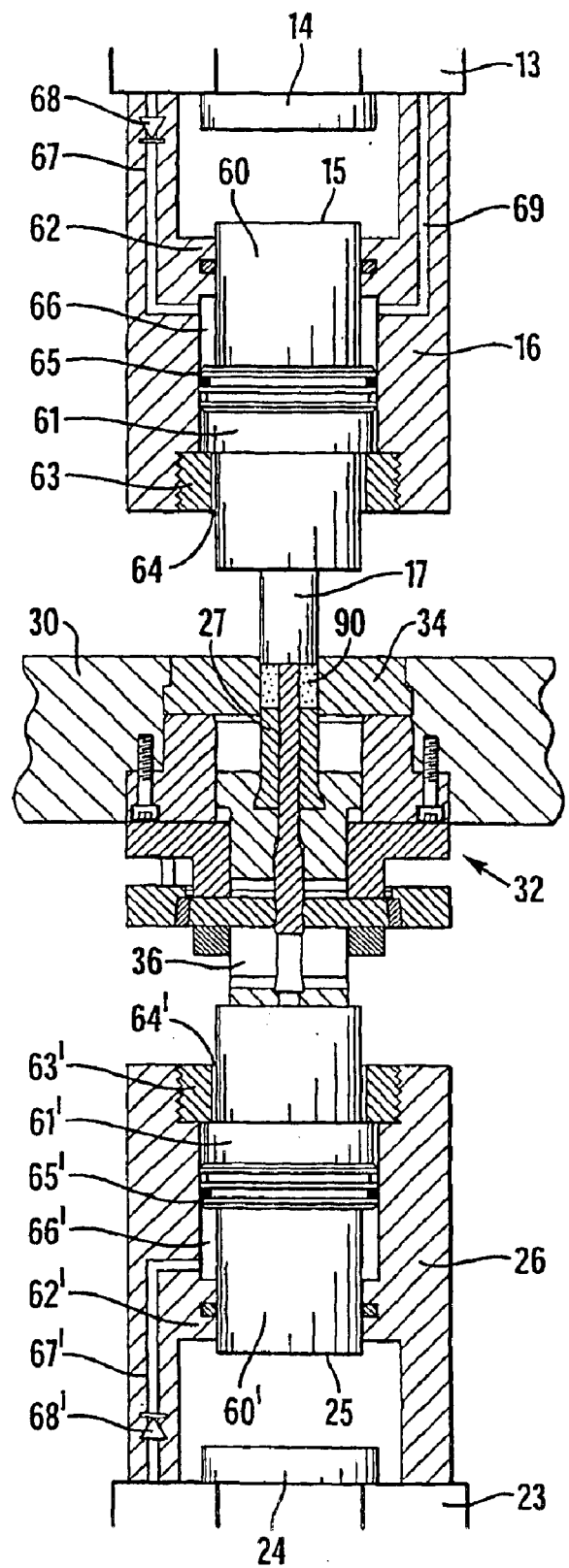
FIGS. 7a, and 7b show parts of an upper and a lower impact unit, and a portion of a tool unit in the forming station at two different moments before the forming operation.

The upper impact body 15, FIG. 7A, consists of a through, cylindrical piston rod 60 having a fixed ring 61. The piston rod 60 is sealingly slidable in an opening in an upper end wall 62 of the upper impact body cylinder 16. In a lower end wall 63 there is a wider opening 64, through which the cylindrical piston rod 60 of the impact body 15 can be moved without any sealing. The fixed ring 61 has a diameter which is slightly smaller than the inner diameter of the impact body cylinder 16, i.e. the fixed ring 61 does not sealingly contact the inside of the cylinder. Above the fixed ring 61, on the other hand, there is a movable ring 65, which can move relative to the piston rod 60, and which is sealed against the inner surface of the impact body cylinder 16, either directly or via one or more sealing rings. Also the inner surface of the movable ring 65 is sealed against the piston rod 60, either through a directly sealing contact or via any not shown sealing ring.

Above the movable ring 65 there is a hydraulic chamber 66, which can be connected to said pressure source of hydraulic fluid, e.g. via any of the piston rods 8 and the yoke 10 to a hydraulic conduit 67, in which there is a non-return valve 68 and a pressure reducing, not shown valve, and to tank or accumulator via a hydraulic conduit 69, in which there is a not shown pressure restricting valve.

Figure 7B:
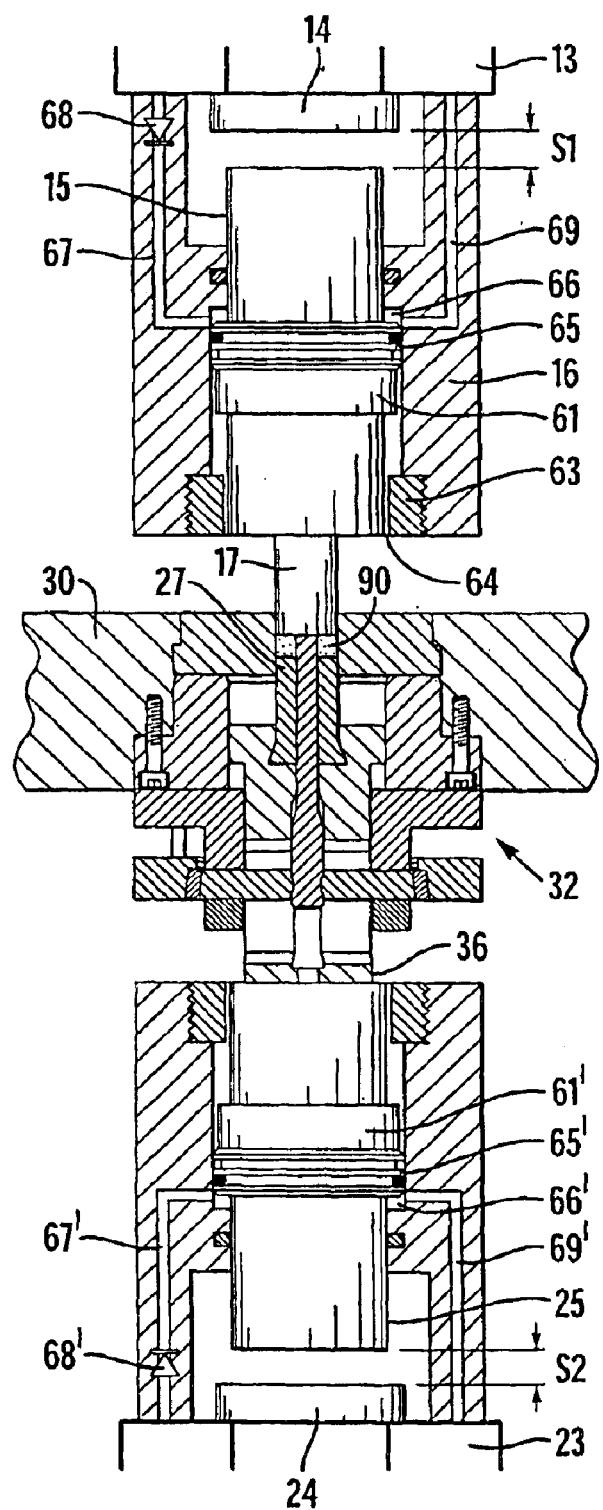

The lower impact body 25 and its impact body cylinder 26 are designed in identically the same way as the upper impact body 15 and the impact body cylinder 16, respectively, with the exception of the lower punch 27 which is not directly fastened to the impact body, as is the case with the upper punch 17 in the upper impact body 15. In FIGS. 7A and 7B the various details of the impact body 25 and the impact body cylinder 26 have the same reference numerals as the details of the upper impact body and the impact body cylinder 16, with the addition of'. Any further description of these details will not be made here, but instead is referred to the above description of the upper impact body 15 and its impact body cylinder 16. As far as the terminology is concerned; it shall, however, be mentioned that the end walls 62' and 63' of the lower impact cylinder 26 shall be denominated lower end wall and upper end wall, respectively. The supply and drainage of hydraulic fluid can be performed in a manner which is analogous with that which has been mentioned in connection with the upper impact unit.

The equipment also includes control and operating devices for the described, movable units, including position sensors 80, 80' for the impact cylinders 13 and 23, respectively, and thus also for the rams 14 and 24, respectively, and position sensors 81 and 81' for the impact bodies 15 and 25, respectively. Said sensors are connected to and transmit information about the position of said units to a central control unit, which comprises computers and auxiliary devices, which are not described here.

The described equipment works in the following way. In the forming station I the space 46 in the die hole 45, FIG. 5, has been filled with working material 90 around the mandrel 35 and has been covered by a lid. The working material 90 may consist of for example a ring of metal, a polymeric material or a composite material, which can include a ceramic or any other formable material, but in the example it is presumed that the working material consists of a metal powder, or possibly a combination of metal and ceramic powders.

When the turntable 30 has been turned about 72°, so that a tool unit 32 with its space 46 filled with powder has been stepped forward—been indexed—from the filling station I to the forming station II, the table is fixed and the tool unit 32 is positioned with very great accuracy concentrically with the upper punch 17. At the same time and/or immediately thereafter, the lower yoke 20 is moved upwards by means of the lower lifting cylinders 22 and the piston rods 9, transporting the lower impact body cylinder 23 and its impact body 25, until the impact body 25 has been brought to contact the bottom surface of the lower punch holder 36, FIG. 7A At the latest at this moment, the lid on top of the powder in the mould cavity is removed, which can be carried out by means of the same robot that has put on, the lid in the foregoing station. Then the upper yoke 10 by means of the upper lifting cylinders 12 and the piston rods 8, bringing with them the upper impact body cylinder 16 and its impact body 15 so far that the upper, tubular punch 17 is brought down to contact the metal powder 90 in the mould cavity 46 and begins to compress the powder until the pressure in the hydraulic chamber 66 reaches a certain, predetermined value. The movement then is stopped and the position is maintained. The lower punch 27 at this stage is in the position shown in FIG. 7A, positioned by the lower impact unit 3, and provides the holding-up force.

The yoke 20 now starts moving upwards by means of the lifting cylinders 22, wherein the lower punch is pressed upwards against the powder 90. The movement continues until the pressure in the hydraulic chamber 66' has reached a certain, predetermined value. This pressure then has also been transmitted to the hydraulic chamber 66 of the upper impact unit via the powder 90. The powder therein has been pre-compacted and centered in the mould cavity 46 in the die 34. The impact bodies 15/25, the hydraulic cylinders 16/26 and the punches 17/27 now are in the positions shown in FIG. 7A.

The next operation aims at setting the stroke lengths S1 and S2 of the rams 14 and 24, i.e. the distance between the upper ram 14 and the upper impact body 15, and between the lower ram 24 and the lower impact body 25, respectively, before the striking operation. The setting can be carried out simultaneously for the upper 2 and the lower 3 impact unit by pressing the yokes 10 and 20 further downwards and upwards, respectively, by means of the hydraulic cylinders 12 and 22, respectively. The pre-compacted powder 90 herein exerts a counter-pressure on the punches 17 and 27, wherein the pressure in the hydraulic chambers 66 and 66' is increased further. The overpressure is relieved through the hydraulic conduits 69 and 69'. The punches 17 and 27 therefore will remain in their positions, while the impact pistons/rams 14 and 24 approach the impact bodies 15 and 25, until their correct stroke lengths S1 and S2, FIG. 2B, are achieved, which is detected by the upper and lower position sensors 80, 81 and 80', 81', respectively. The pressure difference between the lower and upper hydraulic chambers 66' and 66 herein is provided to be so small that it will not have any influence on the stroke lengths to any non-negligible degree.

When the intended stroke lengths S1 and S2 thus have been achieved, the flange 61 and the ring 65 of the upper impact body 15 are in an upper position, and the flange 61' and the ring 65' of the lower impact body 25 are in an upper position and a lower position in the hydraulic cylinders 16 and 26, respectively, FIG. 7B. The impact machine is now ready to consolidate the powder 90 for forming the desired article through a single, simultaneous stroke by the two rams 14 and 24.

The distances S1 and S2 are the travels of acceleration of the rams/impact piston 14 and 24, and are chosen under consideration of in the first place the masses of the rams and the impact bodies such that the total mass $m_1$ of the upper ram 14, the upper impact body 15 and the upper punch 17 will obtain a downwards directed velocity $v_1$ when the ram 14 has hit the impact body 15, and the total mass $m_2$ of the lower ram 14, the lower impact body 25, the lower punch 27 and the lower punch holder 36 obtains an upwards directed velocity $v_2$ when the ram has hit the impact body, wherein the masses and the velocities are so large that the momentums (the quantities of motion) of the masses that move downwards and upwards, respectively, are essentially equal, i.e. so that the following condition applies:

$$m_1 \times v_1 \cong m_2 \times v_2$$

The upper ram 14, which according to the embodiment has a substantially larger mass than the upper impact body 15 (also the opposite condition is conceivable as well as that the ram and the impact body have equally large masses), thus strikes with a required velocity, at the same time as the lower ram 24, which according to the embodiment also has a much larger mass than the lower impact body 25 (although also in this case the masses may be equally large or that the opposite condition applies) strikes with a required velocity on the lower impact body 25. The kinetic energies of the moving masses, which are very high, are transferred via the upper punch 17 and the lower punch 27 to the powder 90. The rams 14 and 24 perform only one stroke, but the kinetic energies which essentially are transferred to the metal powder 90 in the mould cavity 46 are so large that the powder is plasticized, wherein it will flow out and fill the mould cavity and in a millisecond or so form a consolidated body with desired shape. The pressure pulse that arises in the mould cavity because of the single stroke of the rams against the impact body has a duration which is shorter than 0.001 second but has a magnitude lying in the range 1–10 GPa, typically in the range 1.5–5 GPa. Because of the high pressure and the plasticizing caused by the high pressure, probably also the friction between the working material/the powder and the walls of the mould cavity is reduced, as well as between the powder grains, which contributes to, or is a prerequisite for the ability of the material to flow out and to fill all parts of the mould cavity. At the impact the mandrel 35 is essentially stationary relative to the die 34, as well as during the pre-compaction of the powder which is possible because the lower punch holder is movable relative to the mandrel, which is held by the wedges 49 in the slot 39 in the punch holder.

When the rams at a high velocity strike the impact bodies 15 and 25, respectively, the cylindrical piston rods 60 and 60' of the impact bodies move freely relative to the movable rings 65 and 65', respectively, said rings during the stroke remaining essentially in those positions they had adopted prior to the stroke, FIG. 7B. A small play is created between on one hand the retained movable rings 65 and 65' and on the other hand the flanges 61 and 61', corresponding to the final compaction of the powder 90 in vertical direction at the impact.

As soon as the rams 14 and 24 have performed their simultaneous strokes, they are returned to their starting positions in the upper 13 and the lower impact cylinder 23, respectively. The yokes 10 and 20 are returned to their starting positions by means of the lifting cyinders 12 and 22. Pressure fluid is led to the two hydraulic chambers 66 and 66', so that the movable rings 65 and 65' are pressed downwards and upwards, respectively, to contact the flanges 61 and 61, whereafter the movable rings press the entire impact bodies 15 and 25 to their starting positions, in which the flanges 61 and 61' contact the end walls 63 and 63', respectively. The working cycle in the forming station II thereby has been completed, whereafter the functional unit 32, including the formed article, is moved to the next function station through a new rotational movement of the turntable 30.

III—The Mandrel Driving Down Station

The article, which in the forming station II has been formed of powder, is consolidated, i.e. has a high density, essentially without communicating pores, but the individual powder grains, which were softened and deformed during the forming operation, have not yet coalesced, i.e. welded together, at least not to any essential degree. Therefore, the consolidated body can be comparatively brittle and should be handled carefully, before it has been pushed out of the die and been heated to a sintering temperature in a subsequent operation, so that the individual powder grains by this treatment are caused to completely coalesce, i.e. to weld together. Among other things, the mandrel 35 for this reason is driven down and out of the formed article, before the body is pushed out of the die, which not performed until in station IV.

One reason why the mandrel 35 is removed from the formed article by being driven out by means of a mandrel expulsor is that the mandrel is squeezed very firmly in the formed body. If the mandrel should be pulled out of the formed body, such a great pulling force would be required that the ultimate tensile strength of the mandrel might be exceeded causing the mandrel to break. The capacity of the mandrel to resist pressure forces, however, is much greater, and therefore the mandrel instead is driven out by pressure force.

In function station III therefore a mandrel expulsor 170 is provided for driving the mandrel downwards, FIGS. 1, 2 and 8, said expulsor consisting of a vertically oriented rod having a smaller diameter than the hole in the consolidated body 90a. More particularly, the rod/mandrel expulsor 170 consists of a piston rod, or of the end of a piston rod, and can be moved upwards and downwards by means of a hydraulic cylinder 171 on an arm 172, which extends outwards from the column 102a.

The wedges 49 must first be released to enable the mandrel 35 to be driven downwards at the same time as the lower punch 27 is maintained in its position in the die 34. Therefore, also a wedge releaser 174 is provided for that purpose in the mandrel driving down station III, said wedge releaser consisting of a horizontal plate having four upwardly directed projections. The wedge releaser 174 is mounted on a piston rod 175, which extends upwards from a hydraulic cylinder 176, which is mounted on the block 105, which forms part of the stand 6, and communicates with the hydraulic pressure force and with tank via the conduits 156 and 157. On the other hand, the hydraulic cylinder 171 can communicate with the pressure source and tank via not shown conduits provided for this purpose.

The pressing down of the mandrel 35 is suitably performed at the same time as an initial operation is carried out in the forming station II for the next article that shall be formed in that station, i.e. when the lower impact unit 2 has been brought upwards to its starting position for a stroke.

The mandrel expulsion is initiated by the wedge releaser 174 being pressed upwards by means of the hydraulic cylinder 176, so that the locking ring 50 is pushed maximally upwards to contact the outwards directed flange of the lower part 37b of the punch holder guide 37, FIG. 8. Thence, the wedges 49 are released and can be pressed out from their engagements with the mandrel 35 in the region of the concavity 48.

Thus, when the edges 49 have been released, the rod 170 is pressed down to contact the upper end of the mandrel 35 and pushes the mandrel down through the hole in the formed body 90a, at the same time as the wedges 49 are pressed out of the concavity 49, and thereafter they slide against the grip portion 47 of the mandrel. The end positions of the mandrel and of the wedges are shown in FIG. 8.

Because of built-in compression forces in the body 90a, the body 90 will expand slightly in the region of the central hole of the body, when the mandrel 35 is pushed out of the hole, however, not so much that the body will contact the rod 170, which is being driven downwards. Therefore, the rod 170 now can be brought upwards, back to its upper starting position above the die 34 by means of the hydraulic cylinder 171, which can be carried out at the same time as the wedge releaser 174 is lowered to its lower, inoperative position by means of the hydraulic cylinder 176. This causes the locking ring 50 to drop down by its own weight, such that an initial contact is established between the bushing ring 51, the inner, circumferential surface of which is tapered conically upwards, and matching rear edges 49a of the wedges 49, which are correspondingly shaped.

Now, the operations in the mandrel driving down station III are finished. Thereafter the next body is formed in the forming station II, as has been described above, and the turntable 30 is indexed further on about 72° in the clockwise direction by means of the motion devices 7, when the operations in the forming station II are finished. Thus, the tool unit 32, shown in FIG. 8, with the mandrel in its lower position is moved from the mandrel driving down station III to the ejection station IV.

IV—The Ejection Station

In this station a hydraulic cylinder 180 is mounted on the block 105 under the tool unit 32, FIG. 4. A piston rod 181 is concentric with the tool unit in station IV and forms an ejector rod, which is provided to be pushed upwards towards the under side of the lower punch holder 36, in which the mandrel 35 still is in its bottom position with the lower end of the mandrel abutting the shelves 44 in the lower punch holder, FIG. 8.

The formed product 90a is ejected from the mould cavity 46 in the die 34 by means of the hydraulic cylinder 180 and its ejector rod/piston rod 181 therein that said rod is pressed against the lower punch via the lower punch holder, at the same time as a holding-up device is performing a holding-up action against the turntable 30, so that the lower punch and the mandrel are brought upwards until the mandrel 35 will be on a level with the upper edge of the die 34, i.e. to its normal position. The lower punch 37 has, when the mandrel 35 reaches its upper position on a level with the upper surfaces of the die 34 and of the turntable 30, FIG. 9, reached a short distance beyond that level, corresponding to the difference between the levels of the punch 27 and the mandrel 35 in the starting position, FIG. 8. During the upwards directed movements of the lower punch holder 36, the lower punch 27, and the mandrel 35, the grip portion 47 of the mandrel slides against the wedges 49, which in the final moment are re-pressed into the concavity 48 of the mandrel 35 during the influence of the weight of the locking ring 50, which locks the wedges 49 in their locking positions in the region of the concavity 48 through wedge action between the conical inner periphery of the bushing ring 51 and the sloping rear edges 49a of the wedges. The above operation is performed at the same time as the mandrel 35 is driven down in the next tool unit 32 in the mandrel driving down station III and also at the same time as the initial measurements are performed in the forming station II, as have been described in the foregoing. The turntable 30 is fixed and accurately positioned during these measurements.

When the lower punch 27 is brought all the way up through the die 34, the formed body 90a is ejected from the die. This causes the body to expand further, but this time outwards. The expansion in other words is performed stepwise; first inwards in connection with the downwards directed mandrel expulsion, thereafter outwards in connection with the upwards directed ejection of the formed body. This eliminates or reduces the risk that the body is damaged when the internal stresses in the body are released. If the operations were performed in the opposite order, the formed body would be destroyed almost for sure, and if the two operations—the driving down of the mandrel and the ejection of the body—would be carried out simultaneously, the risk of damages would also be very great.

Figure 9:
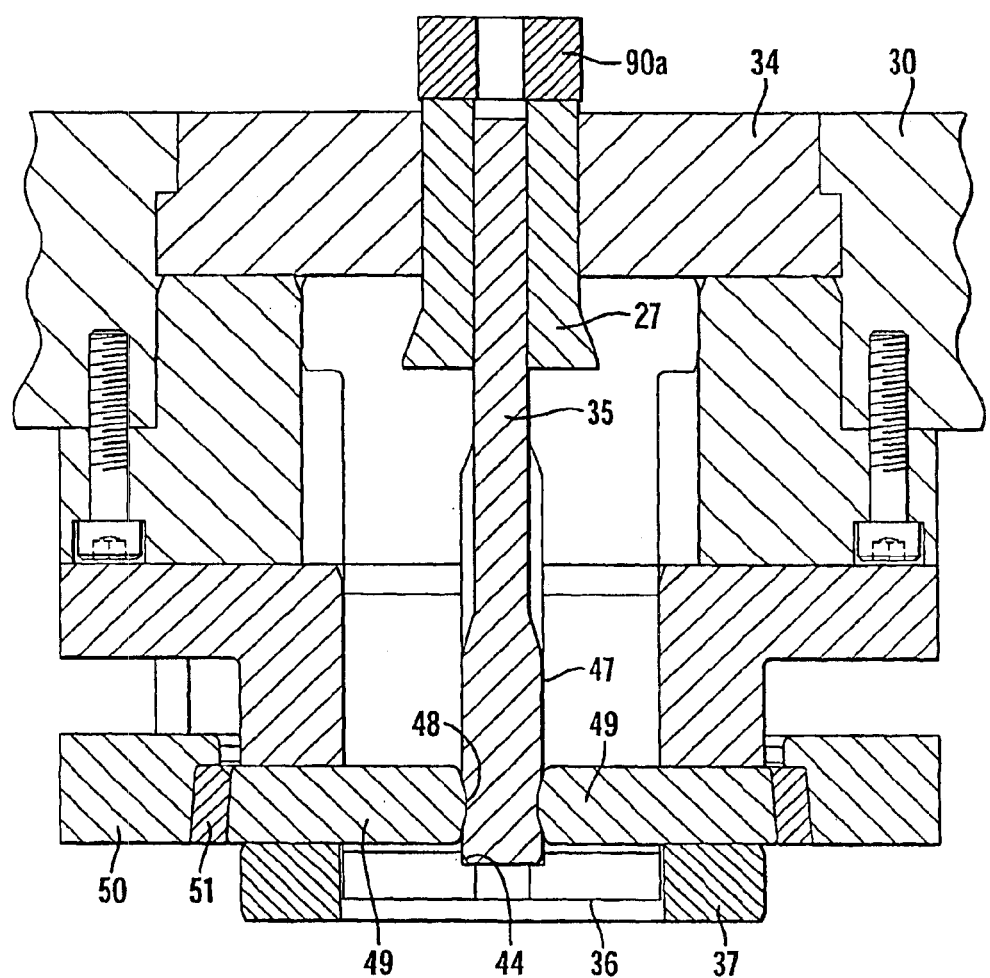
FIG. 9 shows the same tool unit in a cross-section in still another function station.
Figure 10:
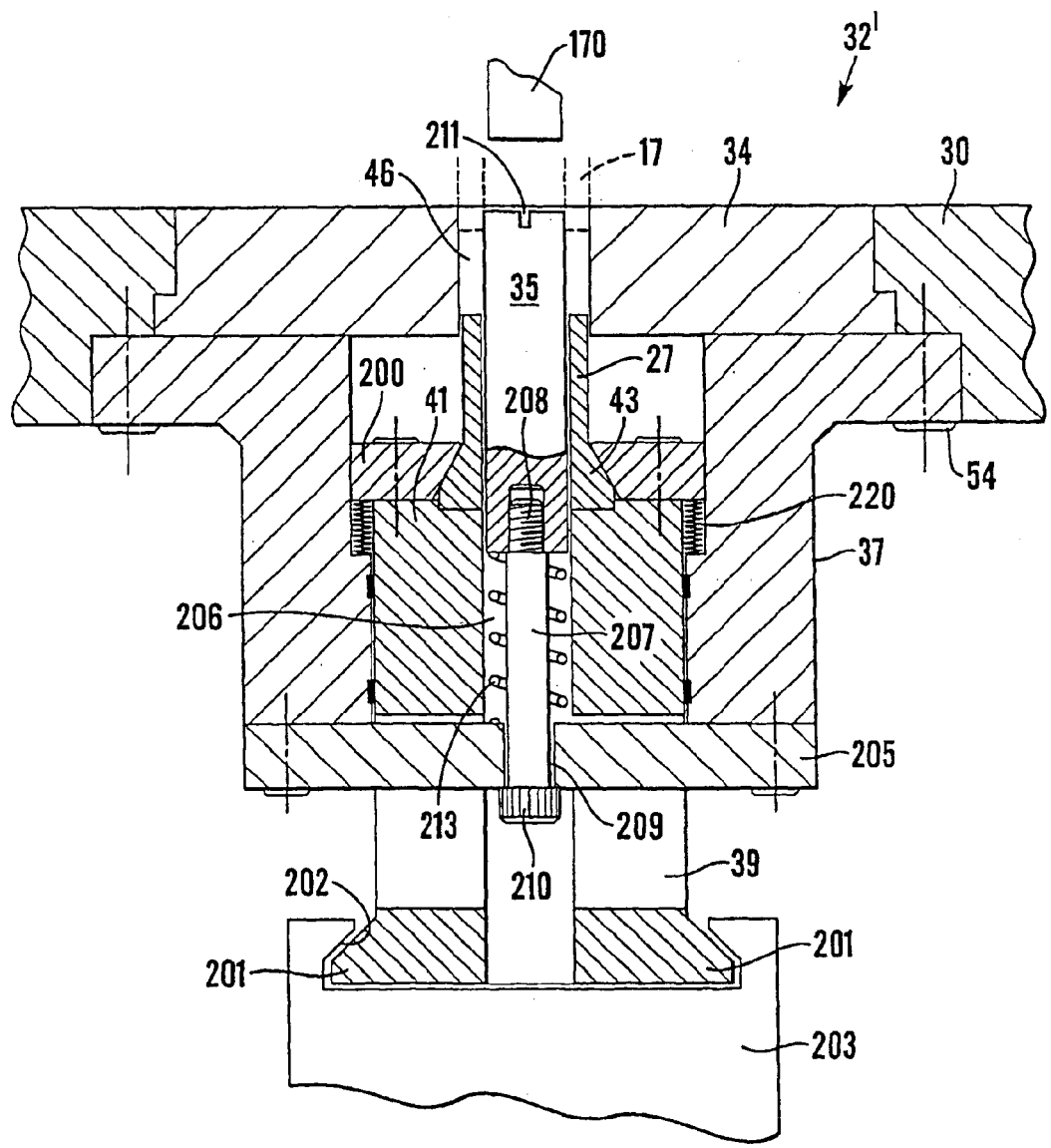
FIG. 10 shows a second embodiment of a tool unit in a cross-section.

Thus, when the formed body 90a has been ejected from the die, it will be resting on the upper surface of the lower punch holder 27, FIG. 9, in a slightly expanded condition. It is fetched from the upper surface of the lower punch holder by means of a not shown, robot-manoeuvred picker and is placed in a suitable container at the side of the machine 1 in order to be heated to a sintering temperature in a subsequent operation, so that the powder grains, which have been softened and deformed in station I during the forming operation, will sinter together (coalesce) to form a dense body of high strength.

V—The Re-Setting Station

A hydraulic cylinder 190 is provided in the station V above the turntable 30 on an arm 191, which extends out from the column 103b. A piston rod extends vertically downwards from the hydraulic cylinder 190. In its lower end, said piston rod has a tubular plunge 192, which has a slightly smaller outer diameter than the lower punch 27 and an inner diameter which is slight larger than the diameter of the mandrel 35. In the station V said plunge 192 is pressed by means of the hydraulic cylinder 190 against the lower punch 27, when the tool unit 32, which has been operated in the ejection station IV, has been brought to the re-setting station V. Thus, the plunge 192 presses the lower punch 27 down into the die 34, moving also the lower punch holder 36 so far that the lower punch and the punch holder 36 will adopt the initial position show in FIG. 6. The mandrel 35 during this operation is fixedly kept in the tool unit 34 by means of the locking wedges 49. Then, the plunge 192 is returned to its upper starting position by means of the hydraulic cylinder 190. The operations in the re-setting station are performed simultaneously with the driving down of the mandrel in the mandrel driving down station III and with the ejection of the formed body in the ejection station IV, i.e. at the same time as the impact units 2 and 3 are being prepared for the forming operation in the forming station II.

In summary, according to the example, the following operations are performed in the different function stations during the same working phase, i.e. more or less simultaneously depending on how long time is required for their performance, namely the following:

in the filling station I the mould cavity is filled with an intended amount of metal powder or corresponding by means of a filling bucket, which can slide against the upper surfaces of the turntable 30, the die 34, and the mandrel 35, because said surface are on the same level;

in the forming station II the impact units are prepared for the forming operation, i.e. the movable units are brought to their starting position for a stroke, FIG. 7A;

in the mandrel driving down station III the mandrel is driven down and is released from the formed body;

in the ejection station IV the formed body is pushed out of the die and the mandrel 35 is returned to is normal position with its upper surface on the same level as the upper surfaces of the die and the turntable; and in the re-setting station V the lower punch 27 and the punch holder 36 are pressed down to their lower starting positions.

Not until the above operations have been performed, the said upper impact unit 2 and said lower impact unit 3 simultaneously perform their strokes and form the body in the mould cavity in a way which has been described above. This has the advantage that all available hydraulic power can be led to the impact cylinders 13 and 23 and thus be mobilized for the very heavy strokes which the respective upper and lower rams 14 and 24 perform.

Embodiment According to FIG. 10

FIG. 10 shows an alternative embodiment of a tool unit, which is designated 32'. Details which have a direct correspondence in corresponding details of the foregoing embodiment, i.e. the tool unit 32, have been given the same reference numerals as in FIGS. 1–9. These details will not be further described here. Only the differences in comparison with the foregoing embodiment will be explained.

The lower punch 27 is provided to be positioned from below. Its lower, widened portion 43 is secured to the lower punch holder 41 by means of a plate 200 and screws. For re-setting/positioning of the lower punch 27, when a stroke has been performed, the lower punch holder 41 has a flange-provided portion in its lower part. The flanges 201 match recesses 202, which are correspondingly designed in a positioner 203, which is connected to or is a part of a not shown piston rod of a not shown hydraulic cylinder, by means of which the lower punch holder 41 and hence the lower punch 27 can be pulled down to the position shown in FIG. 10. Engagement between the flanges 21 and the recesses 202 is established when the table 30 moves the tool unit 32' to a function station, which may be a combined station for expelling the mandrel 35, ejecting the formed product, and re-setting/position the lower punch 27 to its starting position. The positioner 203 thus has a double function. On one hand, it shall eject the formed product by power from said hydraulic cylinder, on the other hand, it shall pull down the lower punch 27 to its lower starting position in a subsequent operation.

The lower punch holder 41 according to the embodiment shown in FIG. 10 is formed of one piece only, which makes it stronger than the lower punch holder according to the previous embodiment. However, there is provided a through groove 39 also according to this embodiment. Through this groove there extends yoke 205, which is secured to the punch holder guide 37 by means of screws. The lower position of the lower punch holder and of the lower punch 27 is defined by a ring 220 of polyurethane, which is provided on an annular shelf in the lower punch holder guide 37.

A central, vertical boring 206 extends through the lower punch holder 41, said boring having the same diameter as the inner diameter of the lower punch 27, i.e. essentially the same diameter as the diameter of the mandrel 35 with some play, so that the mandrel 35 can move in the boring 206. A rod 207 extends in said boring. The rod 207, which has a smaller diameter than the boring 206, is in its upper end provided with threads 208, which match the corresponding threads in a boring in the lower end of the mandrel 35. The rod 207, in the lower end thereof extends through a hole 209 in the yoke 205, and is terminated by a screw head 210 on the underside of the yoke 205. The rod 207 in other words consists of a screw, which is united through the threads 208 with the mandrel 35, which in its upper end is provided with a slot 211 for a screw driver or any other tool.

In the boring 206 there is also a helical compression spring 213, provided around the rod 207 between the mandrel 35 and the yoke 205. In its normal position, the spring 213 presses the mandrel 35 up to its upper normal position. By turning the rod/screw 207 relative to the mandrel 35 by means of a tool adapted to the screw head 210 of the rod/screw 207 and the screw slot 211 of the mandrel 35, the mandrel 35 can be adjusted, so that its upper surface will be on level with, or be positioned slightly below the upper surface of the die 34. The first alternative generally applies when the mould cavity shall be filled with powder by means of a filling bucket; the latter alternative can be accepted when the working material consists of a solid blank, e.g. a ring. However, the mandrel 35 must not be positioned at such a depth that the upper surface of the mandrel will be positioned below that level which be adopted by the lower edge of the upper punch 17, when the upper punch 17 has been positioned in the die prior to the stroke. The position of the upper punch 17 before the stroke has been indicated through dotted lines in FIG. 10.

The tool unit 32' functions in the following way. It is assumed that a product has been formed in the mould cavity 46 in a foregoing operation in the forming station, and that the table 30 with the tool unit 32' thereafter has been brought to a combined station for ejecting the formed product and re-setting the tool unit 32' to its starting position. When the tool unit 32' adopts its position in said station, the flanges 201 slide into the recesses 202 in the combined positioner and ejector 203. When that has occurred, the mandrel 35 is pressed down by means of the downwards acting mandrel expulsor 170, which is connected to a, not shown, hydraulic cylinder in the same way as according to the previous embodiment. When the mandrel expulsor 170 thus has been pressed downwards in order to press the mandrel 35 from above out of the formed product, the spring 213 is compressed. Thereafter, the mandrel expulsor 170 is returned to its starting position and is suitably brought aside.

Thereafter, the lower punch holder 41 and thus also the lower punch 27 are pressed upwards by means of the positioner/ejector 203 and ejects the annular product out of the mould cavity 46, and thereafter the lower punch 27 is returned to its starting position by means of the same positioner/ejector 203. As the formed product successively is ejected, the mandrel 35 is returned to its upper position by means of the spring 213.

The tool unit 32' has essential advantages in comparison with the foregoing embodiment. Thus, its mode of working is essentially simpler, which makes it possible to reduce the number of function stations. Further, the entire tool unit 32' is essentially lighter than the tool unit 32 according to the previous embodiment and has no wedges as is the case in the previous embodiment, which may cause a risk of malfunction. The reduced mass of the tool unit 32' is a significant advantage because it facilitates a quicker change of position between the different function stations.

Figure 11:
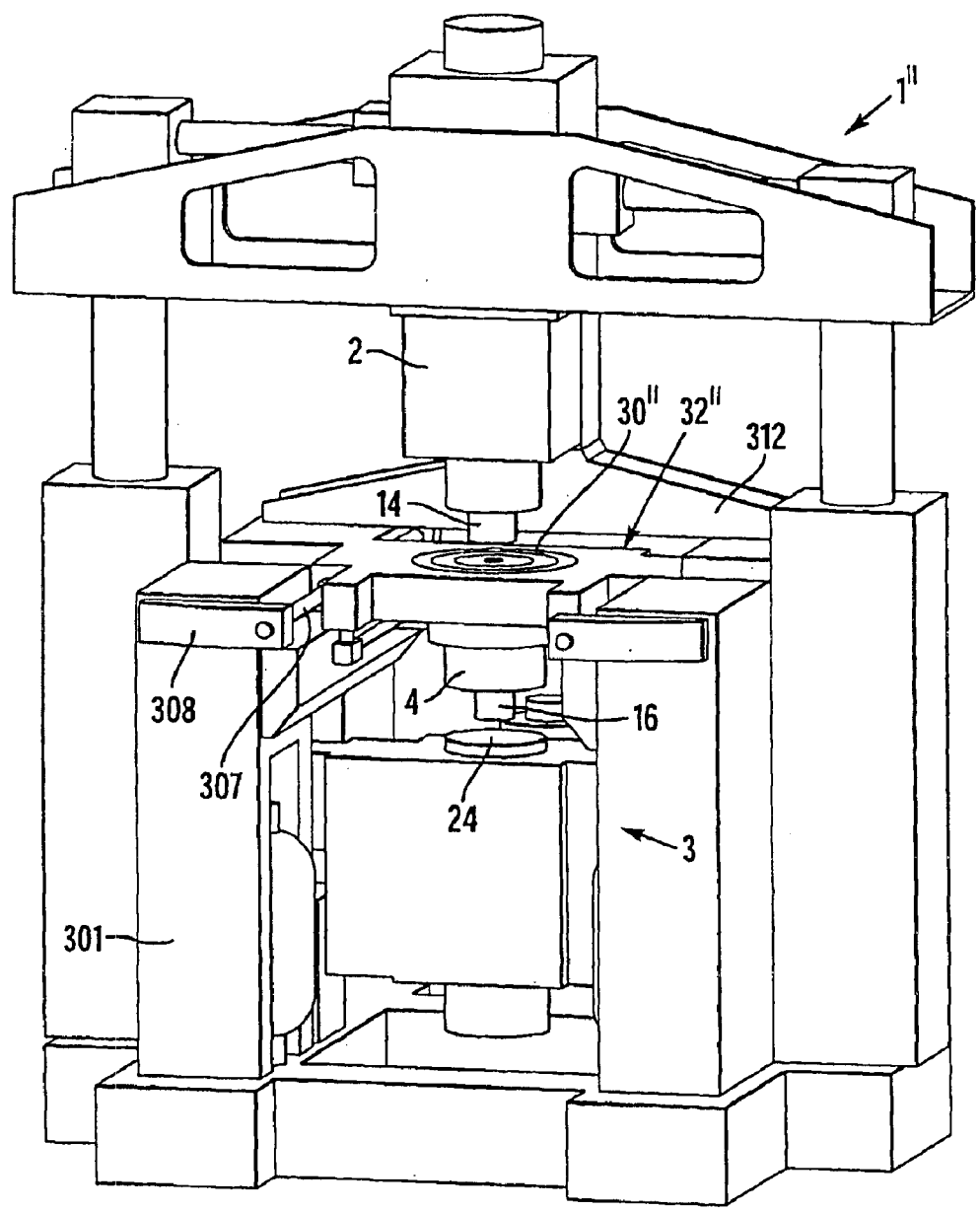
FIG. 11 is a perspective view of an impact machine according to a second embodiment, which includes a tool carrier in the form of a shuttle, which is movable forwards and backwards between two function stations.
Figure 12:
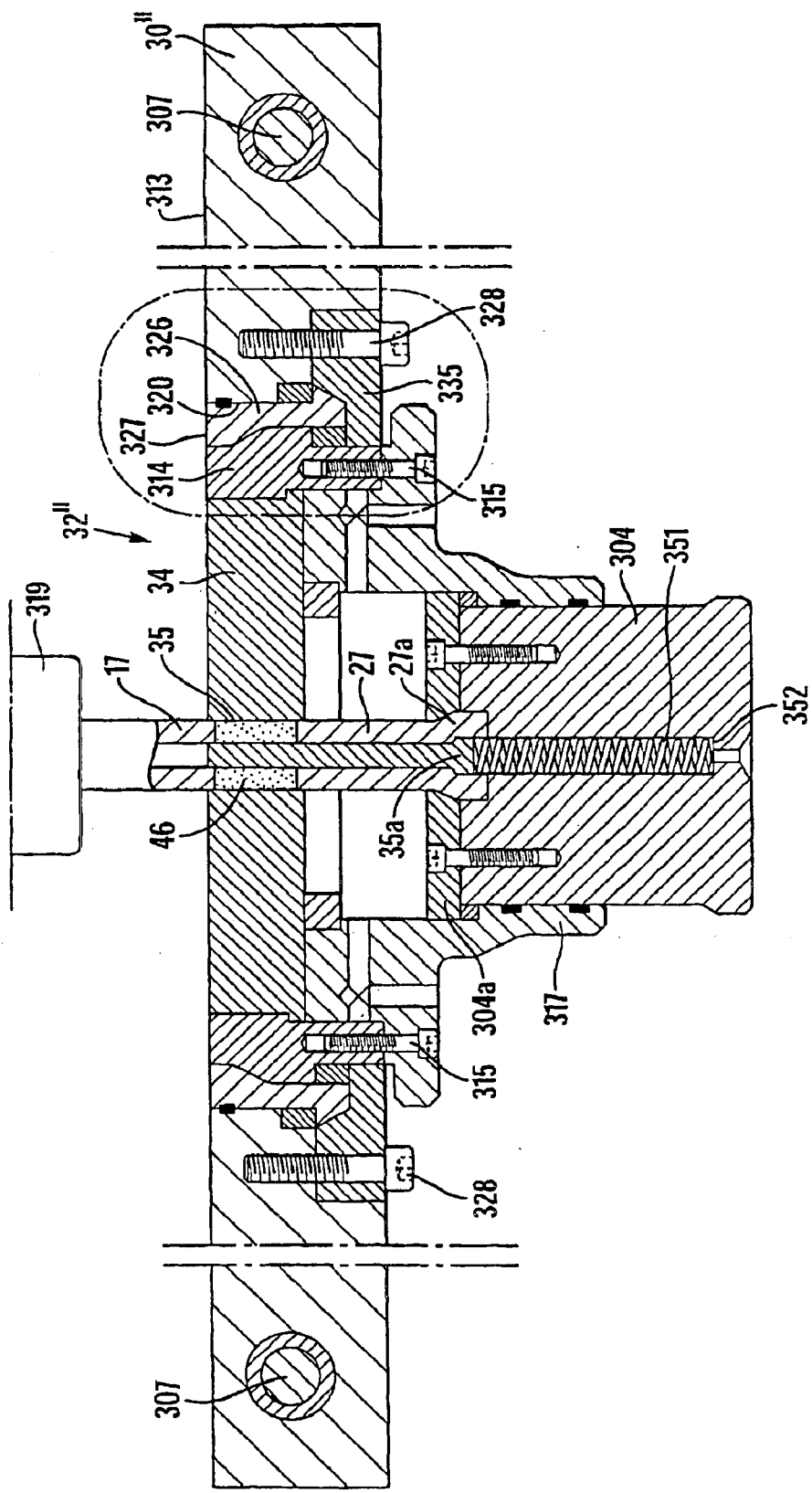
FIG. 12 shows a third embodiment of the tool unit in a vertical cross-section, which tool unit is suitable to be carried also by the shuttle in the impact machine in FIG. 11.
Figure 12A:
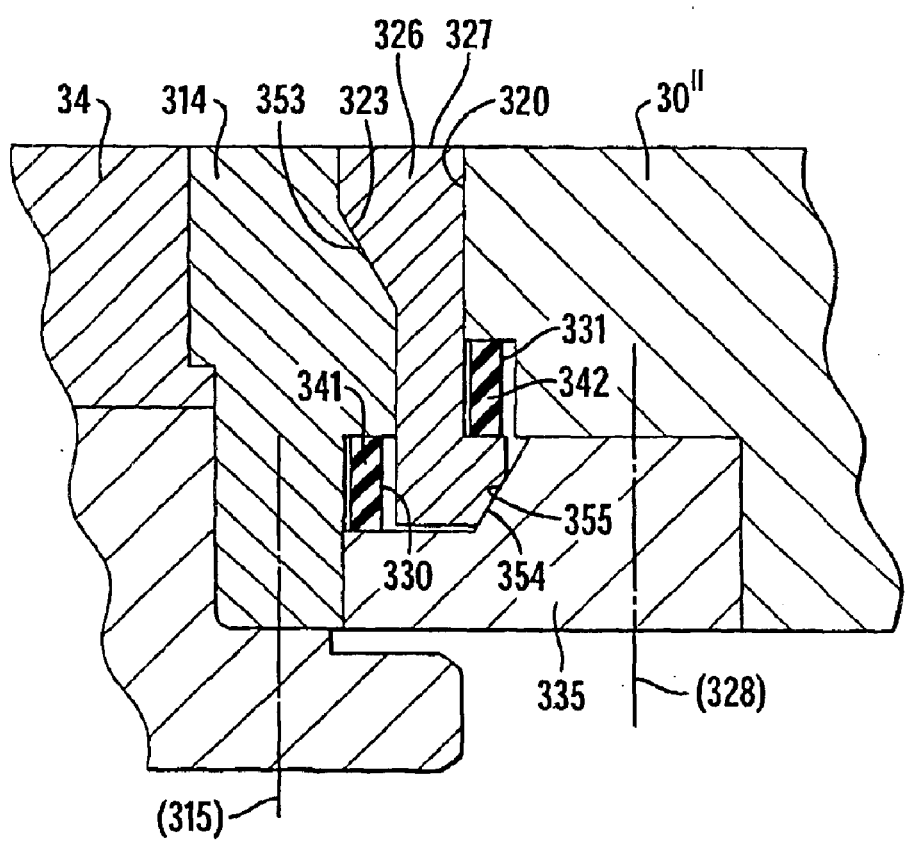
FIG. 12A shows an encircled portion of FIG. 12 on a larger scale.

Embodiment According to FIGS. 11–12

An impact machine 1" is shown in FIG. 11. Its main parts consist of an upper impact unit 2, a lower impact unit 3 and a central unit, which comprises a tool carrier 30". The latter one, according to the embodiment, consists of a horizontal table, which forms a shuttle, which is movable between two function stations; a forming station and a preparation station. The shuttle 30" carries only one tool unit 32", which is movable between the two function stations. During the movement between the function stations, the shuttle 30" slides on a pair of horizontal guides 307, which are mechanically and rigidly connected to a machine stand 301 via arms 308.

In the forming station, the upper impact unit 2 has an upper ram 14 and the lower impact unit 3 has a lower ram 24.

In the preparation station, which is located further back in the view according to FIG. 11, the formed product shall be ejected out of the die in the tool unit 32". As a holder-up at the ejection operation a yoke 312 is provided in the preparation station, which yoke extends above the shuttle 32" quite near its upper surface 313, which is horizontal and flat, on a level with the flat upper surface of the tool unit 32".

The tool unit 32" is in a manner analogous with the previous embodiments provided in a through hole 320 in the tool carrier, i.e. the shuttle 30". The embodiment according to FIG. 12 is, with reference to the mandrel 35, of the sane principle as the embodiment according to FIG. 10, as the mandrel is provided to be re-set by a pressure spring 351 in a lower punch holder 304. The design of the tool unit 32 also has certain differences and important, additional components, which will be apparent from the following description. Details with straight correspondence in FIG. 10 will not be explained further but reference is made to the above description of the tool unit 32". Said details have got the same denominations as in FIG. 10.

The lower punch holder 304 of the embodiment according to FIG. 12 is homogenous, i.e. has no through groove, as according to the previous embodiment, and can therefore stand still heavier impacts. The mandrel 35 has a head 35a in the lower end, which fills a central boring formed in the corresponding way in the head 27a of the lower punch 27. In this way, the mandrel 35 gets a defined, upper position, which is determined by the lower punch 27, when said lower punch is brought to its lower position, in starting position for an impact. The pressure spring 351 is provided in a deep, central boring 352 in the lower punch holder 304.

A mounting ring 314 is also included in the tool unit 32", which ring clamps the die 34 to the lower punch holder guide 317 by means of screws 315. The die 34, the mounting ring 314, the lower punch holder 304 with the lower punch 27, the lower punch holder guide 317, and the mandrel 35 together form the integrated tool unit 32" having a flat upper surface, including also the mandrel 35, on a level with the flat upper surface 313 of the table 30".

The mounting ring 314 has an outer, conical surface 323, which slopes downwards-outwards. The other side surfaces are circular symmetric.

The integrated tool unit 32" is, in an way analogous with the previous embodiments, mounted in a through opening 320 in the table 30". In said opening, between the integrated tool unit 32" and the table", more exactly between the mounting ring 314 and the table 30", there is also an intermediate ring 326 having a flat upper surface 327 and a flat bottom surface at a distance from a flat, annular surface of a mounting plate 335, which is fixed to the table 30" by means of screws 328. The intermediate ring 326 has a conical, inner surface 353 abutting against and matching the conical surface 323 of the mounting ring 315, as well as a conical surface 354 sloping inwards-downwards and abutting against and matching a corresponding inwardly-downwardly sloping surface 355 of the mounting plate 335.

The mounting ring 314 has a cylindrical, annular recess 330 on its outer side facing the intermediate ring 326, which recess is downwards defined by the upper surface of the mounting plate 335, in that part of the mounting plate 335 which abuts the mounting ring 314.

In a corresponding manner, there is a cylindrical, annular recess 331 in the lower corner of the through opening 320 in the table 30".

In the first mentioned, cylindrical recess 330 there is a first resilient ring 341, and in the second cylindrical recess 331 there is a second resilient ring 342. The resilient rings 341 and 342, which are somewhat biased, entirely fills their respective recess 330 and 331 vertically. On the other hand, the rings do not entirely fill the respective recess 330, 331 laterally, which implies that the rings may be compressed in the axial direction and thus spring laterally.

Said conical surfaces 323, 353; and 354, 355, respectively, centre the tool unit 32", so that it gets entirely coaxial to the upper punch 17. This is performed initially at the mounting of the tool unit 32", which is then given a final flat grinding, so that all parts included in the tool unit 32" get flat upper surfaces, including the upper surface of the mandrel 35, quite on a level with the upper surface of the table/shuttle 30". This is of essential importance for making it possible to fill the mould cavity 46, at the forming operating, with powder by means of a filing bucket sliding against the table 30" and against the upper surface of the tool unit 32".

For the function of the tool unit 32" it is also important that the spring 341, which aims at pressing the die 34 and the mounting ring 314 upwards, and the spring 341, which aims at pressing the die 34, the mounting ring 314 and the intermediate ring 326 downwards, lie on each side of the intermediate ring 326. This contributes to bringing the die, as well as the mandrel and the mounting ring 314 on level with the table 32" and with the intermediate ring 326. On the other hand, the intermediate ring 326 and the die 34 and the mounting ring 314 can move upwards relative the table 30" through compression of the outer spring 342, and the die 34 with the mandrel 35 and the mounting ring 314 can move downwards relative the intermediate ring 326 and the table 30" through compression of the inner spring 341. When everything is in resting position and the springs 341 and 341 have expanded and biased, all said upper surface are on level with one another.

The springs 341 and 341 are suitably made as rings of polyurethane or possibly any other resilient polymer. Also mechanical springs are in principle conceivable, but polyurethane is a preferred spring material.

The thus described impact machine and the table 30" with its in the table resiliently mounted tool unit 32" functions in the following way.

In the preparation station the mandrel 35 is by means of a not shown mandrel pusher driven so far down in the boring 352 in the lower punch holder 304 during compression of the spring 351, that the mandrel is entirely released from the compacted body, which has been formed in a foregoing forming operation. Then, said body is ejected out from below by means of the lower punch 27 in a way as described in connection with the previous embodiment. For the ejection there can in some cases be required a great power, which is transferred via the die 34 and the mounting ring 314 to the intermediate ring 326, so that the tool unit 32" and the intermediate ring 326 are pressed upwards causing the outer, resilient polyurethane ring 342 to be compressed until the tool unit 32" and/or the intermediate ring 326 abuts the yoke 312, which occurs before the resilient ring 342 has been maximally compressed. This implies that the guides 307 are not subjected to any overloading during the ejection operation.

When the formed product thus has been ejected out from the mould cavity 46 in the preparation station, the lower punch 27 is withdrawn to its starting position shown in FIG. 12. At the latest in connection herewith, the tool unit 32" springs back to its starting position, i.e. so that the upper surfaces of the tool unit 32", the intermediate ring 326 and the turntable/shuttle 30" again will lie on a level with one another, which is guaranteed through the springing back action of the outer resilient ring 342. When this has occurred, the forming cavity 46 is filled with metal powder, which can simply be performed by means of a filling bucket, which can consist of just a vertical, metal powder filled tube, which rests against the upper surface of the table 30". During the filling operation the metal filled tube/filling bucket is caused to slide against the upper surfaces of the table 30", the intermediate ring 326 and the tool unit 32", which is possible because these details have flat and even upper surfaces, which are on a level with one another and do not have any parts which project to form any hindrance in the path of the filling bucket. Thus, the filling bucket is moved to the area of the mould cavity 46, which is filled with the powder, and thereafter the filling bucket is moved back; also this time sliding against the tool unit, the intermediate ring and the table top.

The table 30", now sliding on the guides 307, is moved to the forming stating, FIG. 11 and FIG. 12. In the forming station the upper punch 17 is lowered a distance into the mould cavity, so that the powder is slightly compacted, the lower punch 27 functioning as holding-up tool. During the forming operation, the upper and lower rams 5, 6 strike simultaneously at a high velocity against the upper punch holder 319 and the lower punch holder 311, respectively. The conceptions simultaneously and synchronously, however, are relative conceptions, which have been mentioned in the description of the background of the invention. In practice, one of the rams will hit its punch somewhat before the other ram. In consideration of the high velocities, the time difference cannot always be neglected. As the punches 17 and 27 successively move into the mould cavity 46, compressing the metal powder between them, also the resistance of the powder successively is increased. Also, function between the powder and the wall of the mould cavity 46 arises. Neither the resistance of the powder against the respective punch, nor the friction which the powder exerts against the die 34 in the upper and in the lower part of the mould cavity, respectively, is necessarily uniform. As a matter of fact one has in practice to count on a certain degree of uniformity. All this implies that a resulting vertical, axial force normally acts on the die during the impact operation. This can be either upwards directed or downwards directed. In the former case, the vertical force is essentially absorbed by the outer, resilient polyurethane ring 342. In the latter case, the force is essentially absorbed by the inner, resilient polyurethane ring 341. The capacity of the resilient rings 341, 342 to absorb the vertical forces in other words implies an efficient dampening of the force pulse of short duration which can arise. To the extent that a force pulse nevertheless is transferred to the table 30", such a pulse will be further damped by the table due to its considerable mass, so that the stresses which may be transferred from the die 34 to the guides 307 and to the machine stand 301 will be so small that they do not damage the machine or its included parts. Air existing in the space between the lower punch holder 304 and the die 34 is pressed out at the impact through expansion channels provided in the lower punch holder guide 317.

It shall be understood that the invention can be completed and modified within the scope of the appending patent claims. Thus, e.g. the intermediate ring 26 can be designed in many other ways than has been shown in the example. For example flanges and recesses can be placed the other way round, e.g. be reversed, with the maintenance of the principle that two different resilient elements or sets of resilient elements are provided, one outer one on the outside of the intermediate ring and an inner one on the inside of the intermediate ring, while one of these resilient elements or sets of resilient elements are provided to absorb downwards directed forces and the other of the resilient elements or sets thereof are provided to damp upwards directed forces acting on the tool unit.

Among modifications might also be mentioned that the resilient elements not necessarily need to consist of elastic rings. Also metallic spring elements of various kinds, e.g. helical springs provided in the spaces 330 and 331 are conceivable. Further, it is conceived that the upper punch, possibly also the lower punch, is integrated with the upper and with the lower impact member, respectively, which can consist of a hydraulic impact piston, the piston rod of which is united with the upper punch, and as the case may be, with the lower punch, respectively.

What is claimed is:

1. A method for the manufacturing an annular article, which substantially comprises metal, ceramic material, and/or polymer, comprising:
    forming an annular cavity (46) defined by a wall of a through hole in a die (34), the upper end surface of a tubular, lower punch (27), which is introduced into a lower mouth of the die hole, and a mandrel (35), which is introduced from below into the die hole through the lower punch to at least essentially on a level with the upper surface of the die;
    filling the cavity with a formable working material, which shall form said article;
    introducing an upper punch into the upper mouth of the die hole, so that a closed mould cavity is formed;
    simultaneously striking the upper punch and the lower punch towards one another at such a high velocity that the working material between the punches plasticizes and flows out and fills all parts of the mould cavity, when the punches are maximally moved towards one another, so that an annular body is formed;
    removing the upper punch through a relative movement upwards out of the die;
    expulsing the mandrel out of the annular body by action of a mandrel expulsor (170), which is pressed against the mandrel from above; and
    pushing the annular body from below out of the die by means of the lower punch, so that said annular article is obtained.

2. The method according to claim 1, comprising:
    introducing the tubular, upper punch into the upper mouth of the die hole in a forming station, so that a closed mould cavity is formed,
    striking the upper punch and the lower punch simultaneously towards one another in the forming station at such a high velocity that the working material between the punches is plasticized and flows out and fills all parts of the mould cavity when the punches are maximally brought towards one another to form upwards out of the die in the forming station; and
    moving the die, which is carried by a tool carrier, to a mandrel expulsion station, in which the mandrel is expulsed from the annular body by action of said mandrel expulsor (170), which is pressed from above against the mandrel.

3. The method according to claim 2, comprising pushing the annular body from below out of the die using the lower punch in the mandrel expulsion station or in any other station subsequently to the mandrel having been expulsed from the annular body in the mandrel expulsion station but prior to measurements in the forming station, and/or in the mandrel expulsion station.

4. The method according to claim 2, comprising transporting the die between function stations, mounted in a carrier.

5. The method according to claim 4, comprising bringing the lower punch by the carrier, as the carrier is moved, while the upper punch is stationary relative to the direction of transportation of the carrier.

6. An impact machine for the manufacture of an annular article, which substantially comprises metal, ceramic material, and/or polymer, comprising:
    a tool carrier, which comprises a die (34), for forming therein an annular cavity (46) defined by a wall of a through hole in said die, the upper end surface of a tubular, lower punch (27), which is introduced into the lower mouth of the die hole, and a mandrel (35), adapted to be inserted from below into the die hole through the lower punch to at least essentially on a level with the upper surface of the die;
    an upper impact unit (2) to be able, via an upper, tubular punch (17), to strike against a formable working material, which shall form said article, and which is provided in the cavity in the die, simultaneously as the tubular, lower punch is struck upwards by means of a lower impact unit (3);
    wherein the upper, tubular punch and lower, tubular punch are provided to be simultaneously struck towards one another by means of said upper and lower impact units at such a high velocity, that the working material between the punches is plasticized and flows out and fills all parts of the mould cavity, when the punches are maximally brought towards one another to form an annular body;
    a mandrel expulsor (170) to push the mandrel out of the annular body subsequent to the upper punch having been removed through a relative movement upwards out of the die; and
    members provided to push the annular boy out of the die using the lower punch, subsequent to the mandrel having been driven out of the annular body, so that said annular article is obtained.

7. The impact machine according to claim 6, comprising:
    a movable carrier to hold the die, and motion devices to move the carrier and hence the die between different function stations, which comprise at least one forming station and at least one mandrel expulsion station.

8. The impact machine according to claim 7, comprising a separate ejection station for ejecting the annular body subsequent to the mandrel having been driven out of the annular body in the mandrel expulsion station.

9. The impact machine according to claim 8, wherein the expulsion of the mandrel, the ejection of the annular body and the re-setting of the mandrel to its starting position, performed in a common station, however, not in the forming station.

10. The impact machine according to claim 6, wherein said carrier comprises a turntable (30).

11. The impact machine according to claim 6, that wherein said carrier comprises a shuttle (30"), which can be moved to and fro.

12. The impact machine according to claim 9, wherein the filling of the annular cavity with new working material is performed in the common station.

13. An equipment included in an impact machine for the manufacture of an annular article, which substantially comprises metal, ceramic material, and/or polymer, comprising:

a first tool unit (32) comprising a die (34) having a through hole, a tubular, lower punch (27), the outside of which matches the die hole and which lower punch can be introduced into said hole, and a mandrel (35), which matches the hole in the tubular, lower punch and which can be introduced into said punch to form an annular cavity defined by the wall of the hole in the die, the upper end surface of the tubular, lower punch, when that punch is introduced into the lower mouth of the die hole, and the mandrel, when said mandrel is introduced into the die hole, beyond the lower end surface of the tubular, lower punch to at least essentially on a level of the upper surface of the die;

a second tool unit comprising an upper, tubular punch (17), which also matches the die hole and the mandrel, and which can be introduced into the upper mouth of the die hole to form a closed, annular mould cavity defined by the surfaces of said cavity (46) and a bottom surface of the upper punch; and members for removing an annular body which has been formed in said mould cavity, said members comprising:

members for removing the upper punch through a relative movement upwards out of the die;

a mandrel expulsor (170) to drive the mandrel out of the formed annular body through a downwards directed movement relative to the body and relative to the lower punch, by pressure from above against the mandrel; and to push the lower punch upwards, so that the annular body is ejected out of the die hole.

14. The impact machine according to claim 13, comprising:

a movable carrier to hold the die; and one or more motion devices to move the carrier and hence the die between different function stations, which comprise at least one forming station and at least one mandrel expulsion station.

15. The impact machine according to claim 14, comprising a separate ejection station for ejecting the annular body subsequent to the mandrel having been driven out of the annular body in the mandrel expulsion station.

* * * * *